(No Model.)
T. W. MAXEY.
FLOAT FOR WATER GAGES.
No. 358,285. Patented Feb. 22, 1887.
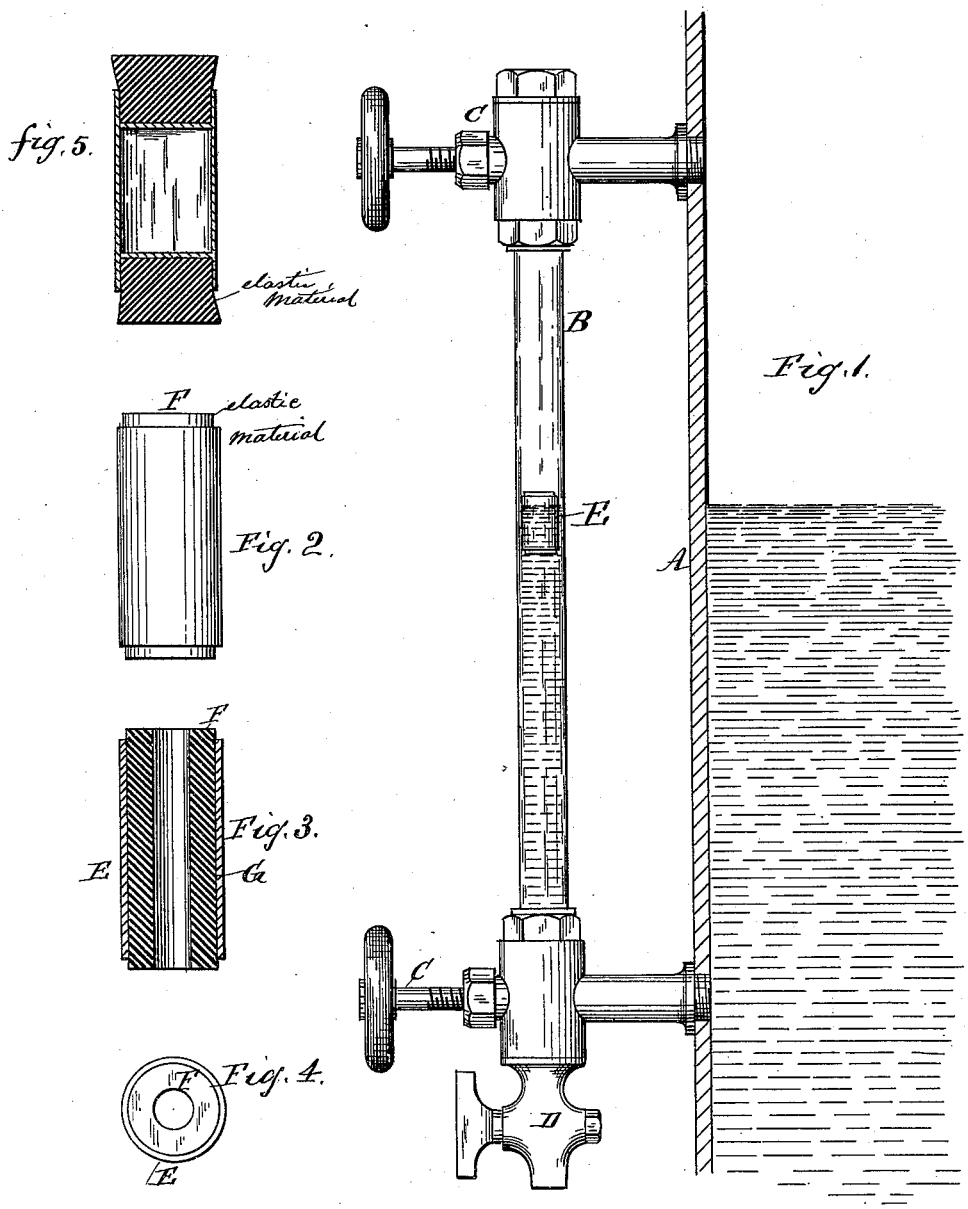
Witnesses
C. W. Werle
S. Brashears
Inventor
Thomas W. Maxey
per O. E. Duffy
Atty.

UNITED STATES PATENT OFFICE.

THOMAS W. MAXEY, OF NEVADA, MISSOURI.

FLOAT FOR WATER-GAGES.

SPECIFICATION forming part of Letters Patent No. 358,285, dated February 22, 1887.

Application filed October 23, 1886. Serial No. 217,024. (No model.)

*To all whom it may concern:*

Be it known that I, THOMAS W. MAXEY, of Nevada, in the county of Vernon and State of Missouri, have invented certain new and useful Improvements in Water-Gages; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to water-gages for steam-boilers and other vessels in which liquid is required to be maintained at predetermined heights, and has for its object to indicate the height of the water in the boiler or liquid in the vessel and to preserve the indicating-float from breaking, which is generally made of glass.

Heretofore glass floats, from any sudden pressure or agitation in the boiler, have come in contact with either end of the glass cylinder, or the metal which forms its bottom and top, and become broken, which generally causes annoyance by filling up the aperture, and thus renders the gage inoperative, besides the loss of time and the cost of the renewal of the float. To overcome these difficulties and to produce a water-gage that will be durable and cheap are further objects of my invention.

To this end my invention consists of making a float of elastic filling of such material as will float on the surface of the liquid, said material to extend beyond the end of the glass tube; or I may provide a closed air-tight vessel with elastic ends or buffers which will cushion the float against violent contact with the ends of the gage, all of which will be more fully hereinafter described.

Referring to the accompanying drawings, Figure 1 is a sectional view of a boiler, with my water-gage shown in elevation. Fig. 2 is an enlarged view of the float. Fig. 3 is an enlarged sectional view of the float. Fig. 4 is an end view of the float, and Fig. 5 is a view of the float with the elastic material secured to the ends thereof.

Referring to the drawings by letters, A is the boiler, with the glass gage B attached thereto by the usual valve-connection, C, the lower one being provided with a blow-off cock, D.

It has always been a source of annoyance and uncertainty to find or know the height of the water in the boiler by the simple glass gage without a float, especially if the boiler is in a dark place, such as the hold of a ship or a cellar. To overcome this difficulty as well as others heretofore referred to, I have made a float of peculiar construction that may be readily seen in almost any light, which I place within the glass gage.

Referring to the enlarged figure of the drawings, E is a glass cylindrical float, within which is a longitudinally-perforated cork, F. The cork projects beyond the glass tube to prevent it from breaking when the sediment is blown out of the glass gage. The hole through the cork permits the free exit of the steam or water when the blow-off cock is open. The glass cylinder E of the float is preferably made of some attractive colored glass; or the glass may be silvered upon the inside, which naturally brightens it.

By using the colored glass a float that will retain its color is obtained which can be readily seen at a considerable distance from the boiler or vessel.

Having thus fully described my invention, what I claim, and desire to secure by Letters Patent of the United States, is—

1. In a water-gage, the combination, with a transparent tube in communication with the water within the boiler or other vessel, of a glass float adapted to rise and fall within the tube, the said float being provided with elastic buffers, substantially as set forth.

2. In a water-gage, the combination, with a transparent tube in communication with the water within the boiler or other vessel, of a glass float located within the tube and having an elastic filling projecting from its ends, for the purpose substantially as set forth.

3. In a water-gage, the combination, with a tube in communication with the water within the boiler or other vessel, of a glass float having a free vertical movement within the tube, and provided with a longitudinally-perforated elastic filling projecting from its ends, for the purpose substantially as set forth.

4. In a water-gage, the combination of the glass tube with a float consisting of a colored cylinder of glass and a cork within and projecting from said cylinder, said cork having a longitudinal opening, substantially as shown and described.

In testimony that I claim the foregoing as my own I affix my signature in presence of two witnesses.

THOMAS W. MAXEY.

Witnesses:
A. J. KING,
M. A. PINKERTON.